(12) United States Patent
Rose

(10) Patent No.: US 10,437,002 B2
(45) Date of Patent: Oct. 8, 2019

(54) UNIVERSAL CABLE INSTALLATION TOOL

(71) Applicant: Derek M. Rose, Cottage Grove, MN (US)

(72) Inventor: Derek M. Rose, Cottage Grove, MN (US)

(73) Assignee: Derek M. Rose, Cottage Grove, MN (US)

( * ) Notice: Subject to any disclaimer, the term of this patent is extended or adjusted under 35 U.S.C. 154(b) by 0 days.

(21) Appl. No.: 15/797,251

(22) Filed: Oct. 30, 2017

(65) Prior Publication Data

US 2018/0129009 A1 May 10, 2018

Related U.S. Application Data

(60) Provisional application No. 62/419,751, filed on Nov. 9, 2016.

(51) Int. Cl.
G02B 6/44 (2006.01)
G02B 6/50 (2006.01)
H02G 1/08 (2006.01)

(52) U.S. Cl.
CPC ......... *G02B 6/4466* (2013.01); *G02B 6/4465* (2013.01); *G02B 6/508* (2013.01); *H02G 1/083* (2013.01)

(58) Field of Classification Search
CPC .................................. G02B 6/46; G02B 6/54
See application file for complete search history.

(56) References Cited

U.S. PATENT DOCUMENTS

| 3,137,765 A | 6/1964 | Lanum |
| 4,368,910 A | 1/1983 | Fidrych |
| 4,453,291 A | 6/1984 | Fidrych |
| 4,601,507 A | 7/1986 | Fallon |
| 5,015,805 A | 5/1991 | Beckloff et al. |
| 5,133,583 A | 7/1992 | Wagman et al. |
| 5,480,203 A | 1/1996 | Hubbell |
| 6,511,266 B1 | 1/2003 | Groot |
| 6,883,782 B2 | 4/2005 | Ames et al. |
| 7,051,999 B2 | 5/2006 | Hewitt |
| 7,226,301 B2 | 6/2007 | Hasegawa |
| 7,246,789 B2 | 7/2007 | Ames et al. |

(Continued)

FOREIGN PATENT DOCUMENTS

| GB | 2470584 | 12/2010 |
| JP | 2010039019 | 2/2010 |

(Continued)

OTHER PUBLICATIONS

Application and File History for Design U.S. Appl. No. 29/624,072, filed Oct. 30, 2017, inventor Rose.

(Continued)

*Primary Examiner* — Jerry Rahll
(74) *Attorney, Agent, or Firm* — Patterson Thuente Pedersen, P.A.

(57) ABSTRACT

Universal cable installation tools and methods for using the tools. A cable installation tool includes a cable fastening end and an opposite projecting end extending from fastening end. A cable can be temporarily fastened to the cable installation tool using the universal cable fastening end, allowing the cable installation tool and the operably coupled cable to be threaded through a wall opening.

8 Claims, 17 Drawing Sheets

(56) References Cited

U.S. PATENT DOCUMENTS

| | | | |
|---|---|---|---|
| 7,837,501 B2 | 11/2010 | Youtsey | |
| D646,939 S | 10/2011 | Johnson | |
| 8,282,079 B2 | 10/2012 | Petti | |
| 9,178,341 B2 | 11/2015 | Maltby | |
| 2001/0042964 A1 | 11/2001 | Bedi et al. | |
| 2010/0072440 A1 | 3/2010 | Wright | |
| 2014/0083262 A1* | 3/2014 | Wisman | H02G 1/00 81/485 |
| 2014/0353561 A1 | 12/2014 | Chen et al. | |
| 2017/0085066 A1* | 3/2017 | Buck | H02G 1/081 |
| 2017/0357073 A1* | 12/2017 | Burek | G02B 6/4457 |

FOREIGN PATENT DOCUMENTS

| | | |
|---|---|---|
| JP | 2015146662 | 8/2015 |
| WO | WO2010063580 | 6/2010 |

OTHER PUBLICATIONS

Harbor Freight Tools © 2017. 50 ft. Nylon Fish Tape Cen-Tech (Item#66505). http://www.harborfreight.com/50-ft-nylon-fish-tape-66505.html.

* cited by examiner

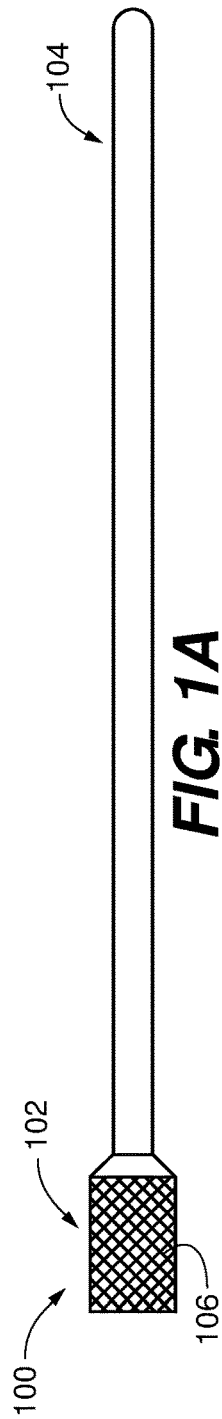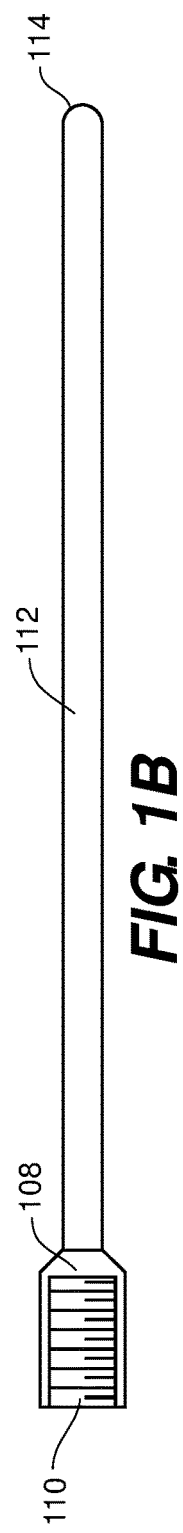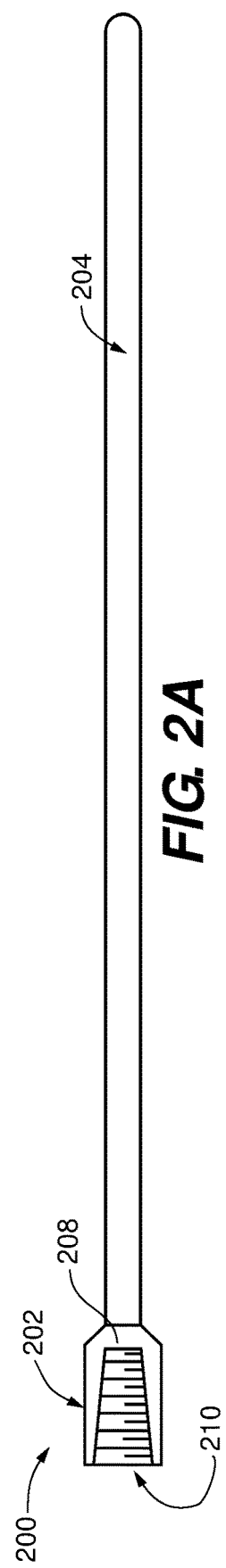

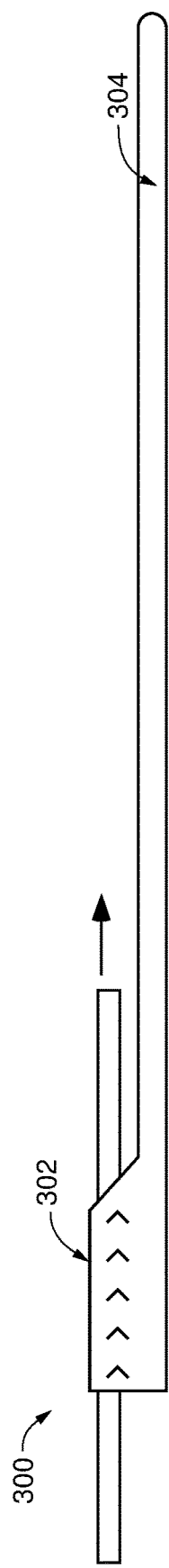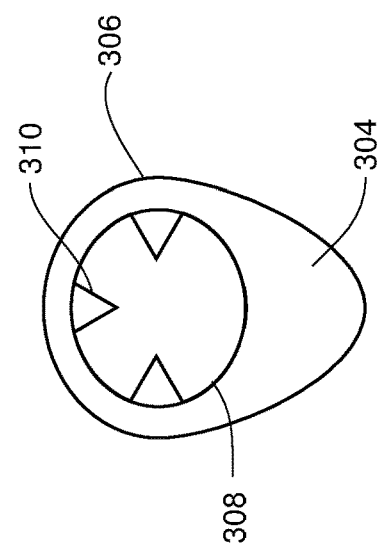
FIG. 3A
FIG. 3B

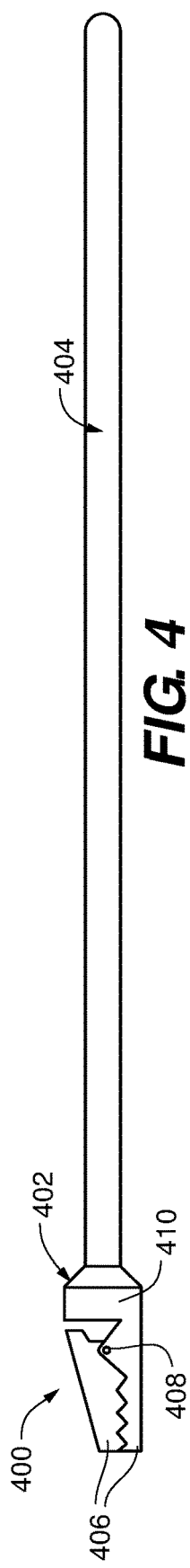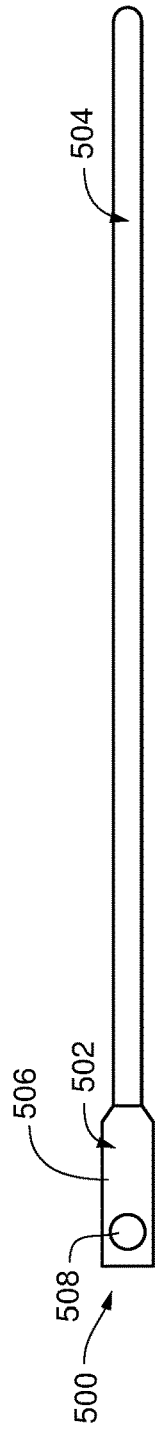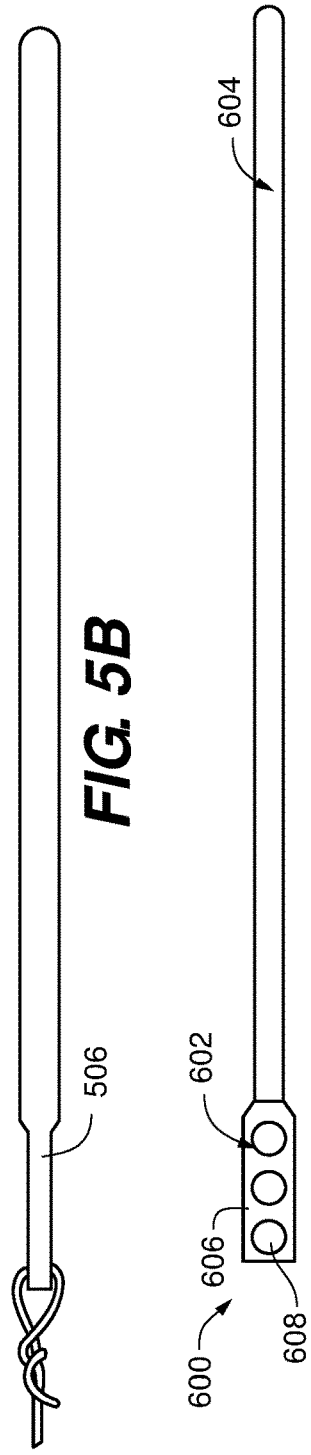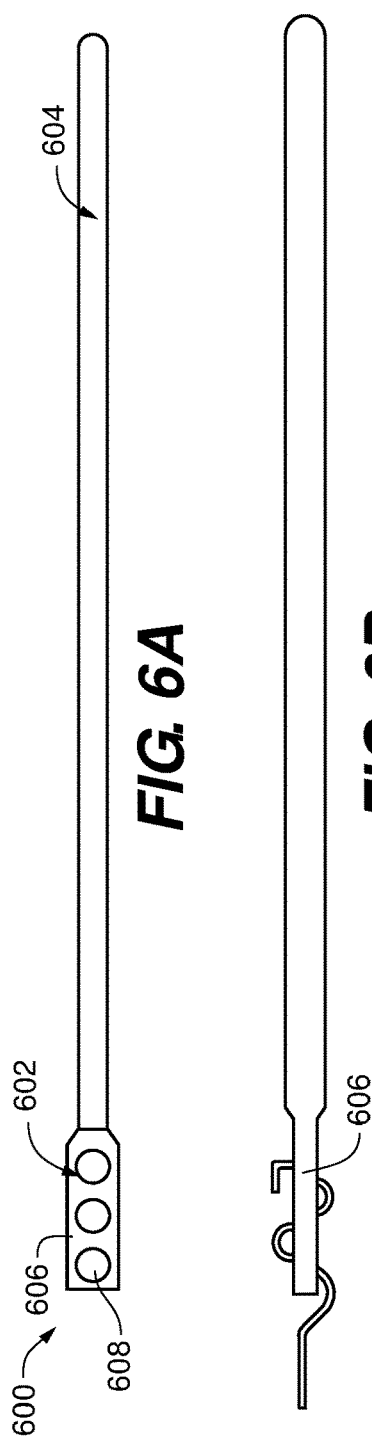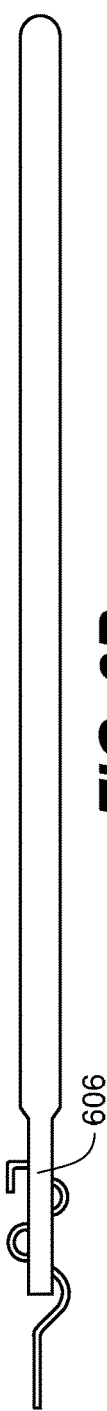
FIG. 4
FIG. 5A
FIG. 5B
FIG. 6A
FIG. 6B

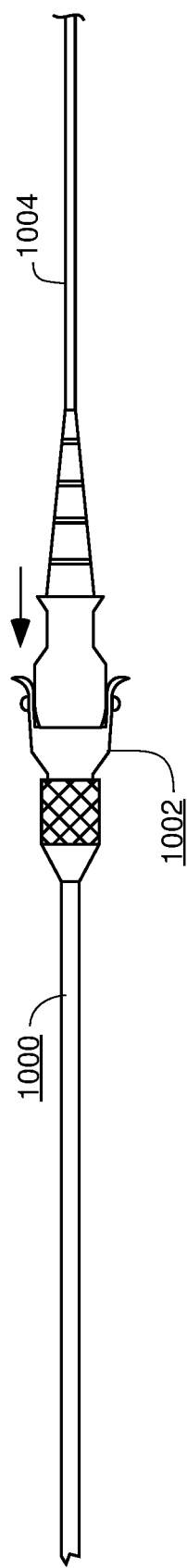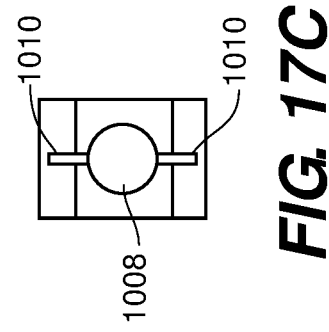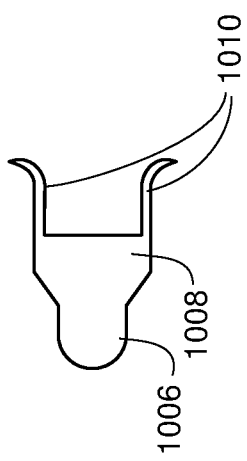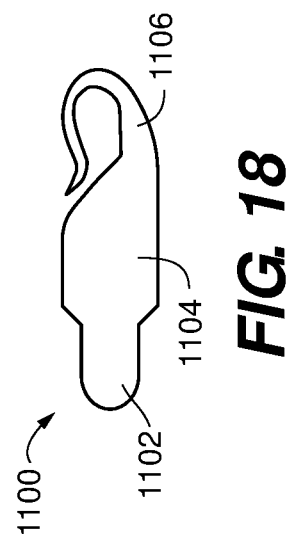

UNIVERSAL CABLE INSTALLATION TOOL

RELATED APPLICATION

The present application claims the benefit of U.S. Provisional Application No. 62/419,751 filed Nov. 9, 2016, which is hereby incorporated herein in its entirety by reference.

TECHNICAL FIELD

Embodiments relate generally to cable installation tools, and more particularly, to universal cable installation tools and methods for using the tools.

BACKGROUND

In building construction, it is often necessary to thread a cable through a wall into an outlet or other pre-drilled opening (speaker location, etc.). This can occur for a number of different types of cables, such as a coaxial, optical, fiber, phone, speaker wire, CAT-5, CAT-6, and the like.

Traditionally, cable installers would simply push an end of the cable through the opening and hope the end reached the intended destination. This practice relies on the rigidity of the cable to push through any obstacles within the wall, such as insulation or construction debris, and often requires multiple attempts to push the cable. This practice increases installation time due to the trial and error, and can often lead to damaged or bent cables.

Tools used to thread cables through long spans or conduits, such as fish tape, are not appropriate for shorter spans like walls due to the flexibility required of the fish tape and the length of the long span tool. Moreover, existing tools typically have a generic end on which the cable is taped, or different attachments for each type of cable to be threaded. Applying and removing tape, or switching out different attachment ends is time consuming and labor-intensive.

Therefore, there is a need for a universal tool for easily inserting and pulling a communications cable through interior and exterior walls.

SUMMARY

Embodiments described herein meet the aforementioned needs of the industry. In embodiments, cable installation tools and methods for using cable installation tools described herein allow a user to easily insert and pass communications cable through interior and exterior walls with ease. Embodiments easily attach and detach from cable without any superfluous tape or other secondary attachment mechanism, saving the installer time and money.

In an embodiment, a cable installation tool comprises a cable fastening end and an opposite projecting end extending from the fastening end. The fastening end generally comprises a partially-hollowed aperture for receiving one or more cables. In an embodiment, fastening end comprises an outer surface, a housing, and an inner surface. The projecting end extends from the fastening end and generally comprises an elongated member and a tip.

In another embodiment, a method for pulling a cable through a wall comprises providing a cable installation tool, temporarily fastening a cable to a fastening end of the cable installation tool, threading the cable installation tool and the cable through the wall opening, and removing the cable installation tool from the cable.

In an embodiment, a cable installation tool comprises a cable fastening end including an outer surface configured to be gripped by an installer, and an inner surface creating at least a partially-hollowed aperture for receiving and temporarily securing a cable; and a projecting end extending from the fastening end including an elongated member having a tip adapted to push and deflect construction debris to allow the projecting end to pass the construction debris, wherein the elongated member is rigid and can be manipulated through a wall by the installer to thread the temporarily secured cable through the wall.

In an embodiment, a system for cable installation comprises an end adapter including a body configured to receive a cable, the body having a tip end, a first end extending from the tip end and configured to move relative to the tip end and comprising an aperture-creating portion, and a second end extending from the tip end and configured to move relative to the tip end and comprising a projection for inserting into the aperture-creating portion a when the first end and second end are proximate each other; and a cable installation tool including a housing for receiving the end adapter when the first end and second end are in proximate attachment and securing the cable, and an elongated member adapted to push and deflect construction debris to allow the projecting end to pass the construction debris, wherein the elongated member is rigid and can be manipulated through a wall by the installer to thread the temporarily secured cable through the wall.

In an embodiment, a fiber optic end adapter for a fiber optic cable installation tool comprises an elongated tip end configured to temporarily couple the fiber optic end adapter to the fiber optic cable installation tool; a fiber optic cable receiving aperture extending from the elongated tip end and configured to receive a fiber optic cable end; and a plurality of flexible wings adapted to snap over the fiber optic cable end to secure the fiber optic cable in the receiving aperture.

In a feature and advantage of embodiments, a cable installation tool screws onto the end of a coaxial cable for inserting the cable through a pre-drilled hole in a wall or other similar structure.

In another feature and advantage of embodiments, the rigidity of cable installation tools allow the user to move insulation or any other foreign object blocking the passage of the coaxial cable or other communications wire from passing through the hole on the other side of the pre-drilled wall.

In another feature and advantage of embodiments, a cable installation tool is constructed of brass for rigidity and corrosion resistance.

In another feature and advantage of embodiments, fastening ends accommodate CAT-5 wire, CAT-6 wire, phone wire, fiber optic cable, and any other type of wire that may need to be installed through a wall into a home or business. Embodiments can also be used for wiring alarm systems in a home or business and passing wires through interior walls that do or do not have insulation.

In another feature and advantage of embodiments, a fastening end comprises a hollow small diameter tube attached to the top of the brass rod with pre-punched forward facing directional teeth that grip the wire as it is inserted from the back of the cable installation tool. Removal of the excess wire is easy. When the wire is successfully pulled through the wall cavity the wire is cut at the base of the tool and pulled out in the reverse direction of insertion.

In another feature and advantage of embodiments, a fastening end comprises a single hole at the base of the cable installation tool to insert a wire through the hole, fold the wire back onto itself and twist the wire around itself to ensure a secure attachment to allow the wire to be pulled through the wall cavity.

In another feature and advantage of embodiments, a cable installation tool can be configured for pulling small diameter wire. In embodiments, a fastening end comprises a roughly one inch flattened base and includes at least three voids to receive smaller diameter communications wire. Such a configuration allows the cable installation tool to grip the wire and successfully pull it through a wall cavity.

In another feature and advantage of embodiments, a fastening end comprises a small spring clip with teeth to clamp onto the wire for pulling through the wall cavity.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 1A is a side view of a cable installation tool having a threaded fastening end, according to an embodiment.

FIG. 1B is a cross-sectional view of the cable installation tool of FIG. 1A, according to an embodiment.

FIG. 2A is a cross-sectional view of a cable installation tool having a tapered threaded fastening end, according to an embodiment.

FIG. 3A is a side view of a cable installation tool having a parallel cable aperture fastening end including a cable temporarily fastened to the fastening end, according to an embodiment.

FIG. 3B is a back cross-sectional view of the fastening end of the cable installation tool of FIG. 3A, according to an embodiment.

FIG. 4 is a side view of a cable installation tool having a clipping fastening end, according to an embodiment.

FIG. 5A is a top view a cable installation tool having a single aperture fastening end, according to an embodiment.

FIG. 5B is a side view of the cable installation tool of FIG. 5A including a cable temporarily fastened to the fastening end, according to an embodiment.

FIG. 6A is a top view a cable installation tool having a three-aperture fastening end, according to an embodiment.

FIG. 6B is a side view of the cable installation tool of FIG. 6A including a cable temporarily fastened to the fastening end, according to an embodiment.

FIG. 17A is a side view of a fiber optic cable installation tool and a fiber optic end adapter having a fiber optic cable temporarily fastened to the fiber optic end adapter, according to an embodiment.

FIG. 17B is a side view of the fiber optic end adapter of FIG. 17A, according to an embodiment.

FIG. 17C is a bottom view of the fiber optic end adapter of FIG. 17A, according to an embodiment.

FIG. 18 is a side view of another fiber optic end adapter, according to an embodiment.

Figure 2B:
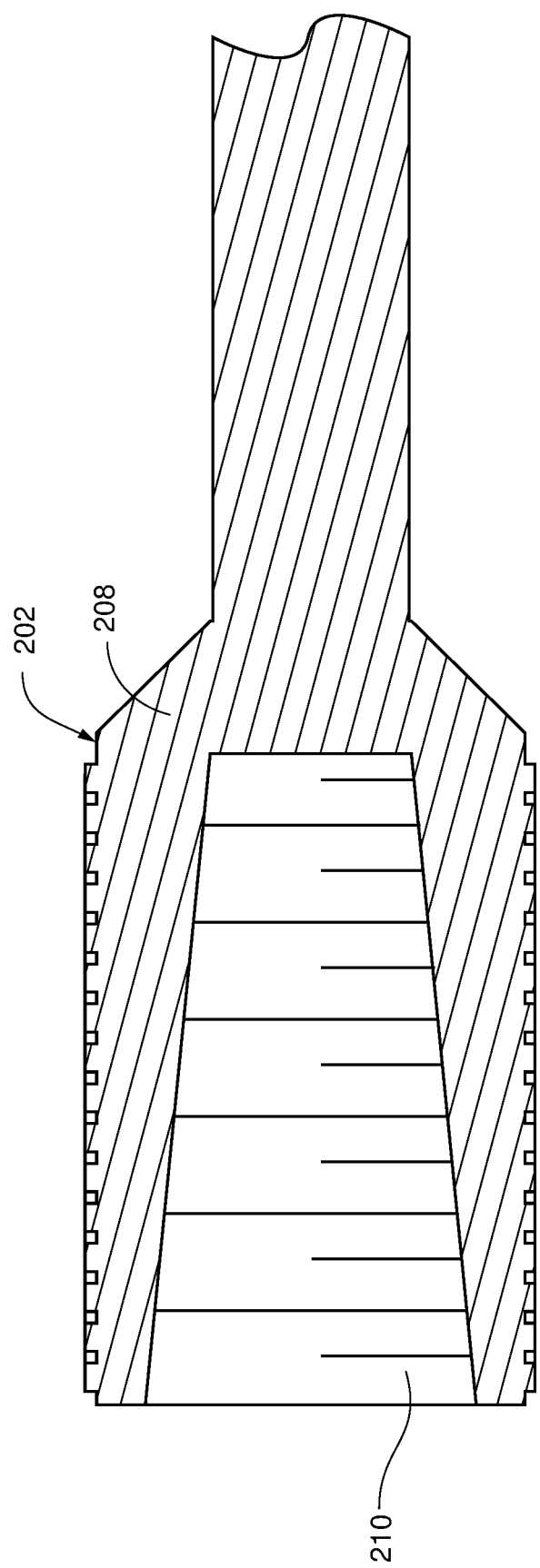
FIG. 2B is a cross sectional side view of the fastening end of the cable installation tool of FIG. 2A, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 1A and 1B, a cable installation tool 100 having a threaded fastening end is depicted, according to an embodiment. Cable installation tool 100 generally comprises a cable fastening end 102 and an opposite projecting end 104 extending from fastening end 102.

Fastening end 102 generally comprises a partially-hollowed aperture for receiving one or more cables. In an embodiment, fastening end 102 comprises an outer surface 106, a housing 108, and an inner surface 110.

Outer surface 106 comprises a cylindrical covering of housing 108 and inner surface 110. In an embodiment, as depicted in FIG. 1A, outer surface 106 is cross-hatched or otherwise etched to provide grip to the user. In an embodiment, outer surface 106 comprises a 5/16" diameter cross hatched end for grip. In other embodiments, outer surface 106 can comprise different diameters and different gripping mechanisms, such as ridged or suitable gripping materials, such as rubber or plastic.

Housing 108 comprises at least one wall to support outer surface 106 and an opening to receive a cable. As such, housing 108 further comprises the void on which inner surface 110 can be located. For example, outer surface 106 in combination with housing 108 can provide the structure for inner surface 110.

Inner surface 110 can comprise any suitable mechanism to temporarily engage a cable. As depicted in FIG. 1B, inner surface 110 is threaded to grip an inserted cable. The cable can be gripped by inner surface 110 by turning or screwing the cable into the threads.

Projecting end 104 extends from fastening end 102 and generally comprises an elongated member 112 and a tip 114. Projecting end 104 is generally rigid and is configured to pass through insulation, construction debris, and other materials within a wall or pre-drilled wall opening. In certain embodiments, projecting end 104 is 6" in length. In other embodiments, projecting end 104 is 18" in length. In other embodiments, projecting end 104 is 24" in length. Embodiment lengths are sufficient to handle residential and commercial applications and can vary depending on the type of communications wire and the application needed.

In general, embodiment lengths over 24 inches can be cumbersome to use in a confined space. For example, an excessively long projecting end would be difficult to use when trying to fish a communications cable through a wall cavity or multiple cavities at the same time. Excessively long projecting ends can also damage the tool as the long projecting ends would be more susceptible to bending as the length is increased.

Elongated member 112 projects from a wall of housing 108. As depicted in FIG. 1B, elongated member 112 is coupled to the non-opened end of housing 108 and projects therefrom. In an embodiment, elongated member 112 comprises a brass rod between 1/8" diameter and 3/16" diameter.

Tip 114 is located distal the opening of housing 108 at the end of elongated member 112. In an embodiment, tip 114 is slightly rounded to allow cable installation tool 100 to smoothly interface to any insulation, construction debris, or other materials within the wall or pre-drilled wall openings. Tip 114 and elongated member 112 can further move insulation or any other foreign object blocking the passage of the cable from passing through the hole to the other side of the pre-drilled wall.

Referring to FIG. 2A, a cross-sectional view of a cable installation tool 200 having a tapered threaded fastening end is depicted, according to an embodiment. Cable installation tool 200 generally comprises a cable fastening end 202 and an opposite projecting end 204 extending from fastening end 202.

Similar to cable installation tool 100, cable installation tool 200 includes a fastening end 202 that generally comprises a partially-hollowed aperture for receiving one or more cables. In an embodiment, fastening end comprises an outer surface (not labeled due to the cross-sectional view), a housing 208, and an inner surface 210. As shown in FIG. 2, inner surface 210 is tapered to accommodate cables of varying sizes and types.

According to embodiments, the tapered threading of inner surface 210 allows the cable installation tool to be used for phone wire, CAT-5 cable, CAT-6 cable, and fiber optic cable. In embodiments, a larger gauge wire will engage and lock with the larger section of the tapered threading as the wire is turned or screwed into the tapered threading. A smaller gauge wire will engage and lock with a narrower section of the tapered threading as the wire is turned or screwed into the tapered threading. Embodiments therefore allow a user to use a single tool for multiple wire installations. There is no need for the installer to carry additional tools or adapters for the various gauges and types of wire.

Referring to FIG. 2B, a larger cross sectional side view of fastening end 202 of a cable installation tool is depicted, according to an embodiment. FIG. 2B depicts a fastening end having a threaded taper. For example, the threaded taper can be from 3/8" diameter tapering down to 1/16" diameter. The measurements provided here are by way of example only, and are in no way limiting to the scope of invention. Embodiments can therefore accommodate or receive all types of cable.

Referring to FIG. 3A, a side view of a cable installation tool 300 having a parallel cable aperture fastening end including a cable temporarily fastened to the fastening end is depicted, according to an embodiment. Cable installation tool 300 generally comprises a cable fastening end 302 and an opposite projecting end 304 extending from fastening end 302.

Fastening end 302 generally comprises a hollow aperture for receiving one or more cables. Fastening end 302 is positioned substantially parallel to projecting end 304. Though shown as "on top" of projecting end 304, fastening end 302 can be positioned at any relative location to projecting end 304. For example, fastening end 302 can be positioned proximate alongside projecting end 304 or "below" projecting end 304. In an embodiment, fastening end 302 comprises an outer surface 306 and an inner surface 308.

Outer surface 306 comprises a covering for inner surface 308. As such, outer surface 306 and inner surface 308 comprise the structure to receive a cable or wire. In an embodiment, outer surface 306 comprises structure for the user to grip or otherwise manipulate cable installation tool 300.

Referring to FIG. 3B, a back cross-sectional view of fastening end 302 of cable installation tool 300 is depicted, according to an embodiment. Inner surface 308 is shown having a plurality of prongs 310 projecting towards the middle of the aperture. Plurality of prongs 310 can be configured to grip a cable or wire inserted through fastening end 302. As shown, three prongs are shown in FIG. 3B, but one skilled in the art will appreciate that additional or fewer prongs can be utilized. In embodiments, as shown in FIG. 3A, plurality of prongs 310 can be positioned along the entire inner surface 308. In other embodiments, plurality of prongs 310 can be positioned at only a portion of inner surface 308.

Each of the plurality of prongs 310 can be configured to easily allow a cable to be pushed through the aperture, but restrict movement of the cable back out of the aperture. For example, plurality of prongs 310 can be angled within the aperture to slide against the cable and not engage when inserted, but grip against the cable and engage when the cable is pulled back. Plurality of prongs 310 can be positioned at an acute angle relative to the walls of inner surface 308. Accordingly, the cable is temporarily secured or locked within fastening end 302 without the use of tape, manual user pressure, or other superfluous fastener.

In embodiments, a release mechanism (not shown) can loosen or disengage plurality of prongs 310 to allow the cable to be removed from fastening end 302. In still other embodiments, once cable installation tool 300 has been used and the cable is to be set in its position within a wall, the cable can be cut prior to fastening end 302 and the excess previously engaged within fastening end 302 can simply be pulled through.

As shown in FIG. 3A, a cable or wire can be positioned completely through the aperture created by inner surface 308. In other embodiments, the cable can be positioned only partially though the aperture created by inner surface 308.

As further shown in FIGS. 3A and 3B, projecting end 304 is positioned continuous with fastening end 302, such that outer surface 306 is integrated with a distal portion of projecting end 304. In other embodiments, projecting end 304 can be coupled to fastening end 302 by only a portion of outer surface 306.

Referring to FIG. 4, a side view of a cable installation tool 400 having a clipping fastening end is depicted, according to an embodiment. Cable installation tool 400 generally comprises a cable fastening end 402 and an opposite projecting end 404 extending from fastening end 402.

Cable fastening end 402 can comprise an "alligator" style clip including a pair of sprung serrated jaws 406 for creating a temporary fastening to a cable. Jaws 406 can be coupled by a spring 408. One of jaws 406 is coupled to a base 410 for supporting the clipping motion and for further coupling to projecting end 404.

Accordingly, projecting end 404 can be operably coupled to cable fastening end 402, such as base 410. Projecting end 404 can otherwise be substantially similar to the other projecting ends described herein.

Referring to FIG. 5A, a top view of a cable installation tool 500 having a single aperture fastening end is depicted, according to an embodiment. Cable installation tool 500 generally comprises a cable fastening end 502 and an opposite projecting end 504 extending from fastening end 502.

Cable fastening end 502 generally comprises a flattened base 506 having a single aperture 508. Base 506 can comprise any suitable structure that incorporates aperture 508. As depicted, aperture 508 is distal projecting end 504, although aperture 508 can be positioned anywhere along base 506. Aperture 508 is shown as round, but can be any void capable of receiving and securing a cable or wire.

Referring to FIG. 5B, a side view of cable installation tool 500 including a cable or wire temporarily fastened to fastening end 502 is depicted, according to an embodiment. In particular, base 506 is shown having a generally flattened shape compared to projecting end 504. A wire is shown threaded through single aperture 508, looped back and wrapped on itself, thereby creating a temporary attachment to cable installation tool 500.

Referring to FIG. 6A, a top view a cable installation tool 600 having a three-aperture fastening end is depicted, according to an embodiment. Cable installation tool 600 generally comprises a cable fastening end 602 and an opposite projecting end 604 extending from fastening end 602.

Cable fastening end 602 generally comprises a flattened base 606 similar to base 506. However, in base 606, three apertures 608 are spaced throughout base 606. Base 606 can comprise any suitable structure that incorporates three apertures 608. As depicted, three apertures 608 are spaced evenly along base 608, but can be spaced unevenly or off-center along base 608. Apertures 608 are shown as round, but can be any void capable of receiving and securing a cable or wire. Likewise, apertures 608 can be of varying sizes to accommodate different cables.

Referring to FIG. 6B, a side view of cable installation tool 600 including a cable temporarily fastened to the fastening end is depicted, according to an embodiment. A wire is shown threaded "under" a first aperture 608, "over" a second aperture 608 and "under" a third aperture 608. The wire can be looped back and wrapped on itself, thereby creating a temporary attachment to cable installation tool 600. In embodiments, two or more of the apertures 608 can be utilized.

Figure 7:
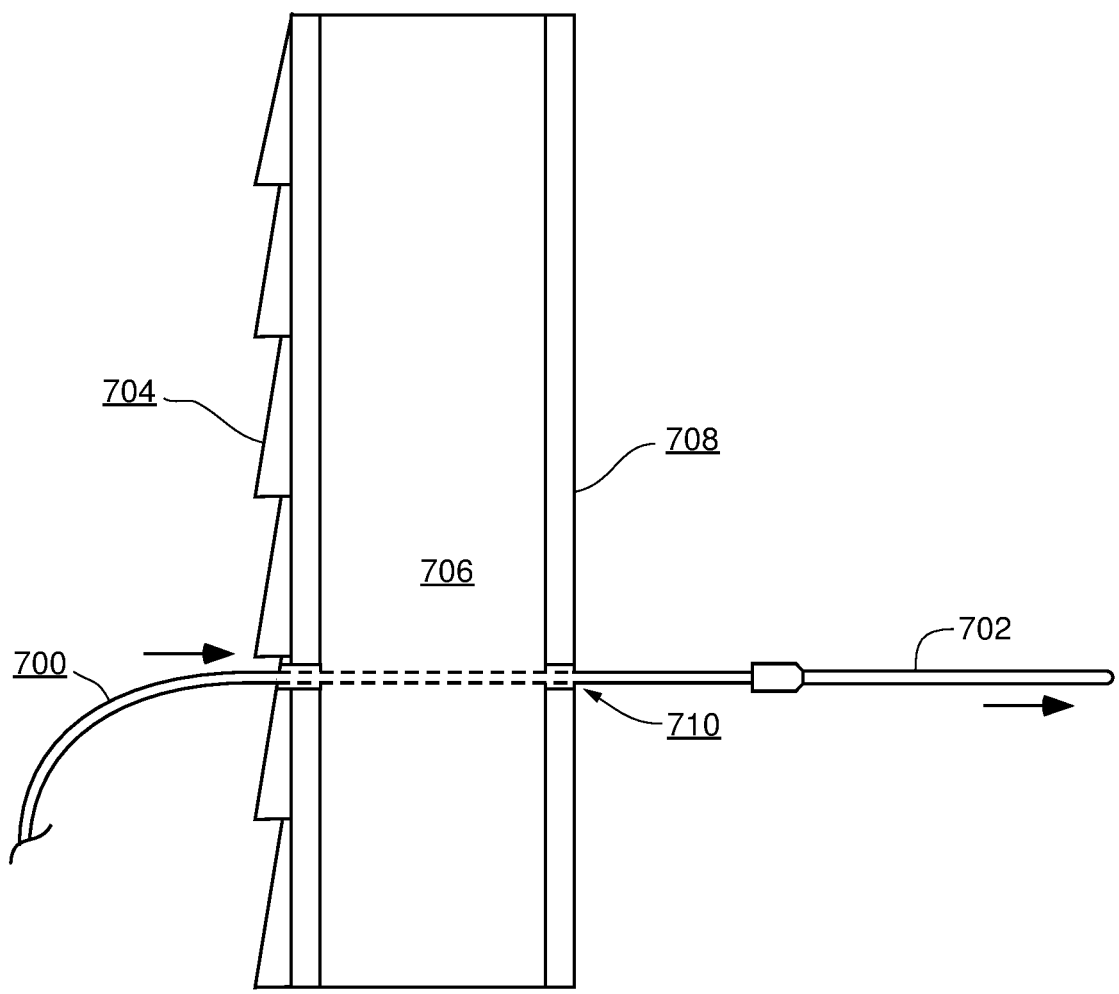
FIG. 7 is an illustration of a cable installation with a cable installation tool, according to an embodiment.

Referring to FIG. 7, an illustration of a cable 700 installation with a cable installation tool 702 is depicted, according to an embodiment. In embodiments, cable installation tool 702 can be substantially similar to cable installation tool 100.

Not shown, cable 700 has been previously coupled to cable installation tool 702. As illustrated, cable installation tool 702 has been inserted through exterior wall 704, insulation 706, interior wall 708 and finally through communications outlet 710. As a result, cable 700 has likewise been threaded through exterior wall 704, insulation 706, and interior wall 708. Cable 700 is now ready for termination at communications outlet 710.

In order to attain the threading of cable 700, the projecting end of cable installation tool 702 can be manipulated proximate exterior wall 704 to search for and find the installation path. The projecting end can be pushed or otherwise forced on exterior wall 704 without damaging the coupled cable 700. For example, if a pilot hole is drilled but is then difficult to locate because of environmental or other construction issues, the cable installation tool 702 can overcome these issues by utilizing the projecting end as a probe to search for the pilot hole. Similarly, the projecting end of cable installation tool can push or manipulate insulation 706 and any obstruction provided by interior wall 708 without damaging the coupled cable 700.

Figure 8:
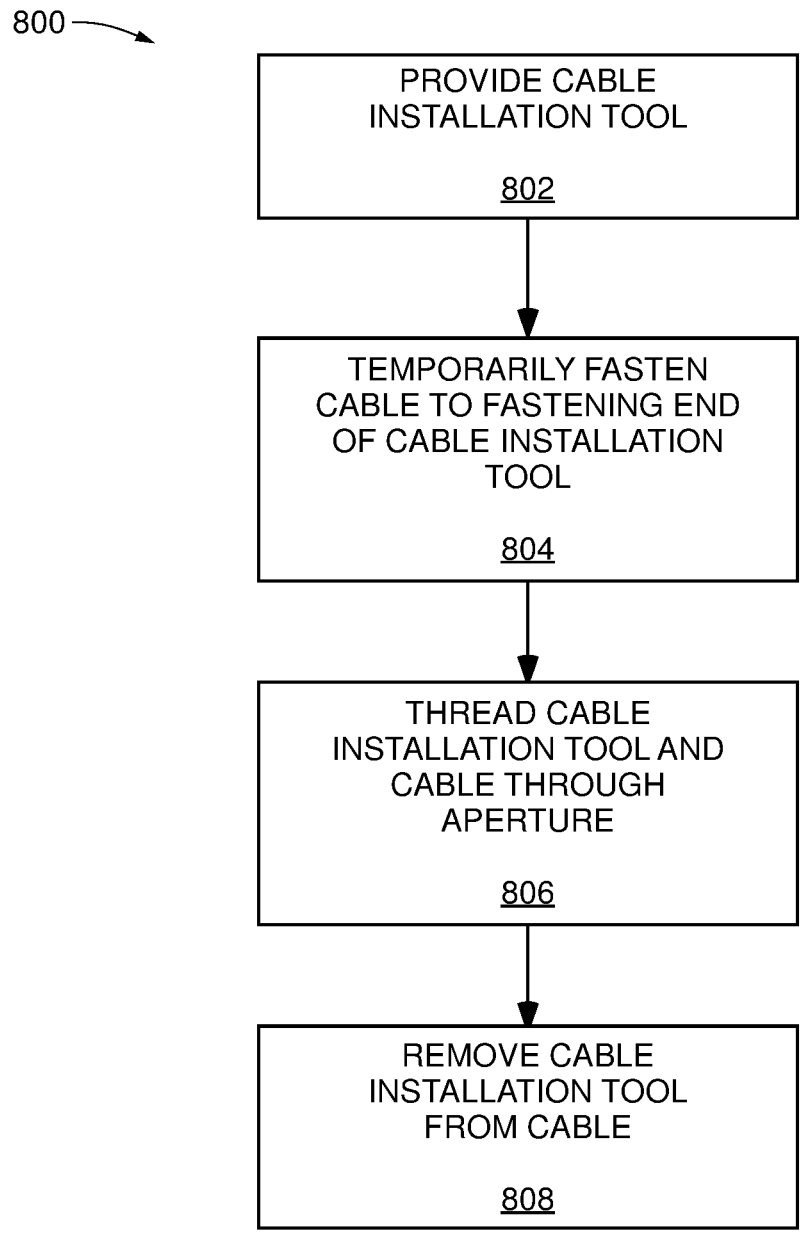
FIG. 8 is a flowchart of a method of installing a cable with a cable installation tool, according to an embodiment.

Referring to FIG. 8, a flowchart of a method 800 of installing a cable with a cable installation tool is depicted, according to an embodiment.

Figure 9:
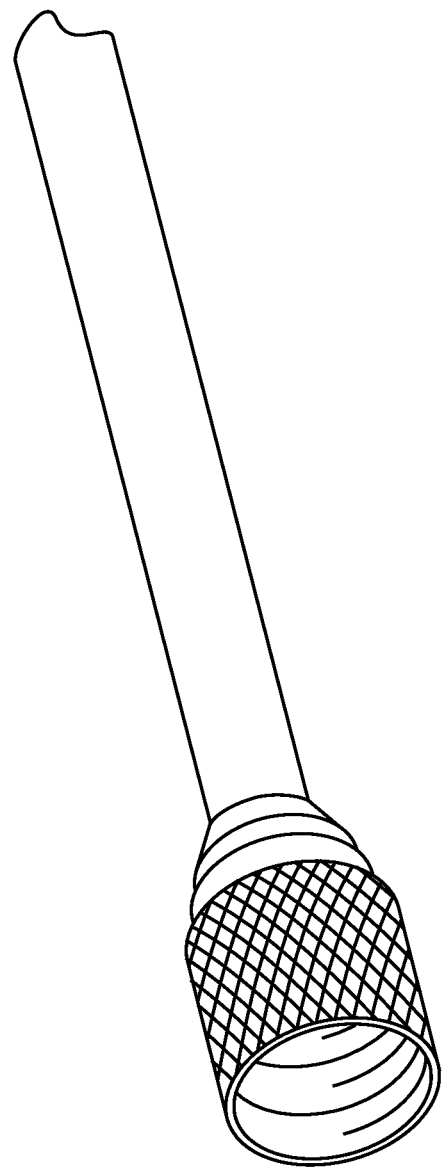
FIG. 9 is a perspective view of a cable installation tool having a threaded fastening end, according to an embodiment.
Figure 10:
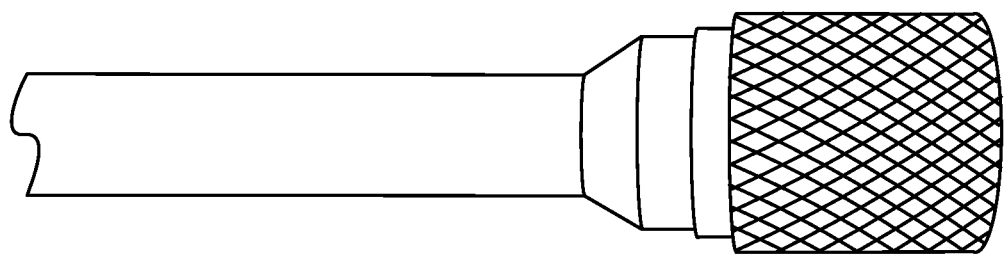
FIG. 10 is a side view of the cable installation tool of FIG. 9, according to an embodiment.
Figure 11:
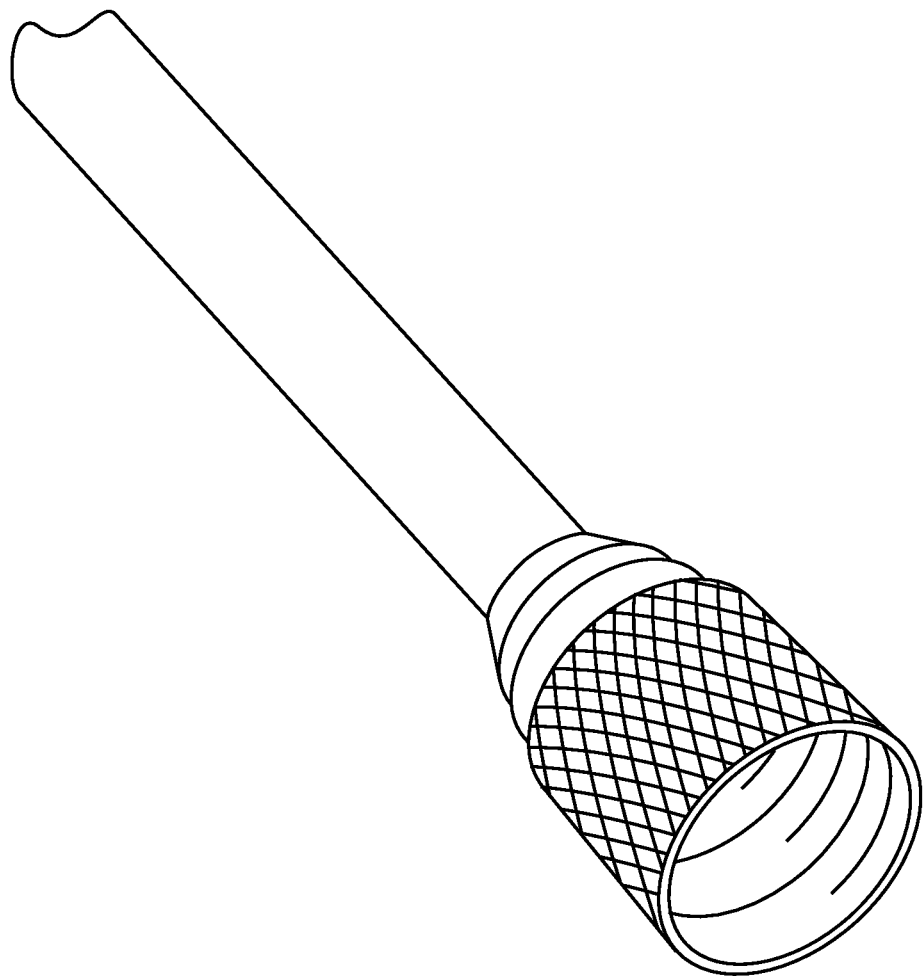
FIG. 11 is a perspective view of a cable installation tool having a threaded fastening end, according to an embodiment.
Figure 12:
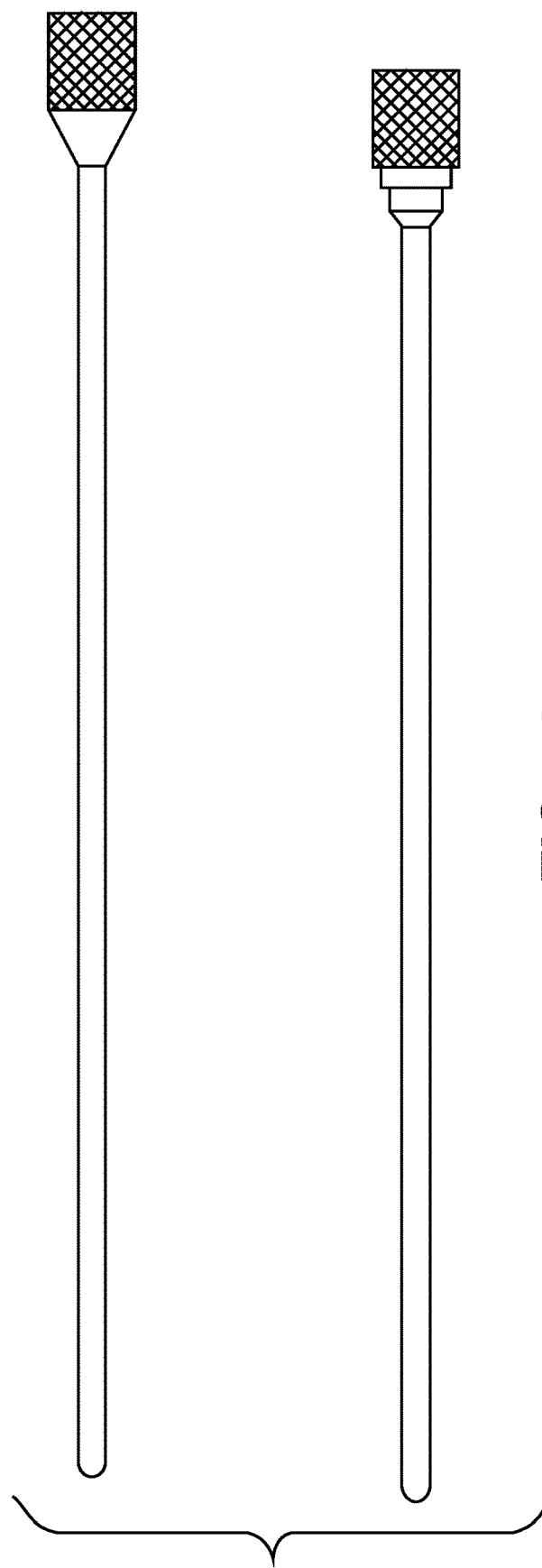
FIG. 12 is a side view of two cable installation tools showing the difference in two embodiments of the inserting end and the fastening end.

Method 800 generally comprises providing a cable installation tool at 802. For example, any of cable installation tools 100, 200, 300, 400, 500, or 600 can be provided to a cable installer. In another example, referring to FIG. 9, a perspective view of a cable installation tool having a threaded fastening end is depicted and can be provided, according to an embodiment. Referring to FIG. 10, a side view of the cable installation tool of FIG. 9 is depicted, according to an embodiment. Referring to FIG. 11, a perspective view of a cable installation tool having a threaded fastening end is depicted and can be provided, according to an embodiment. Referring to FIG. 12, a side view of two cable installation tools showing the difference in two embodiments of the inserting end and the fastening end is depicted and can be provided.

Figure 13:
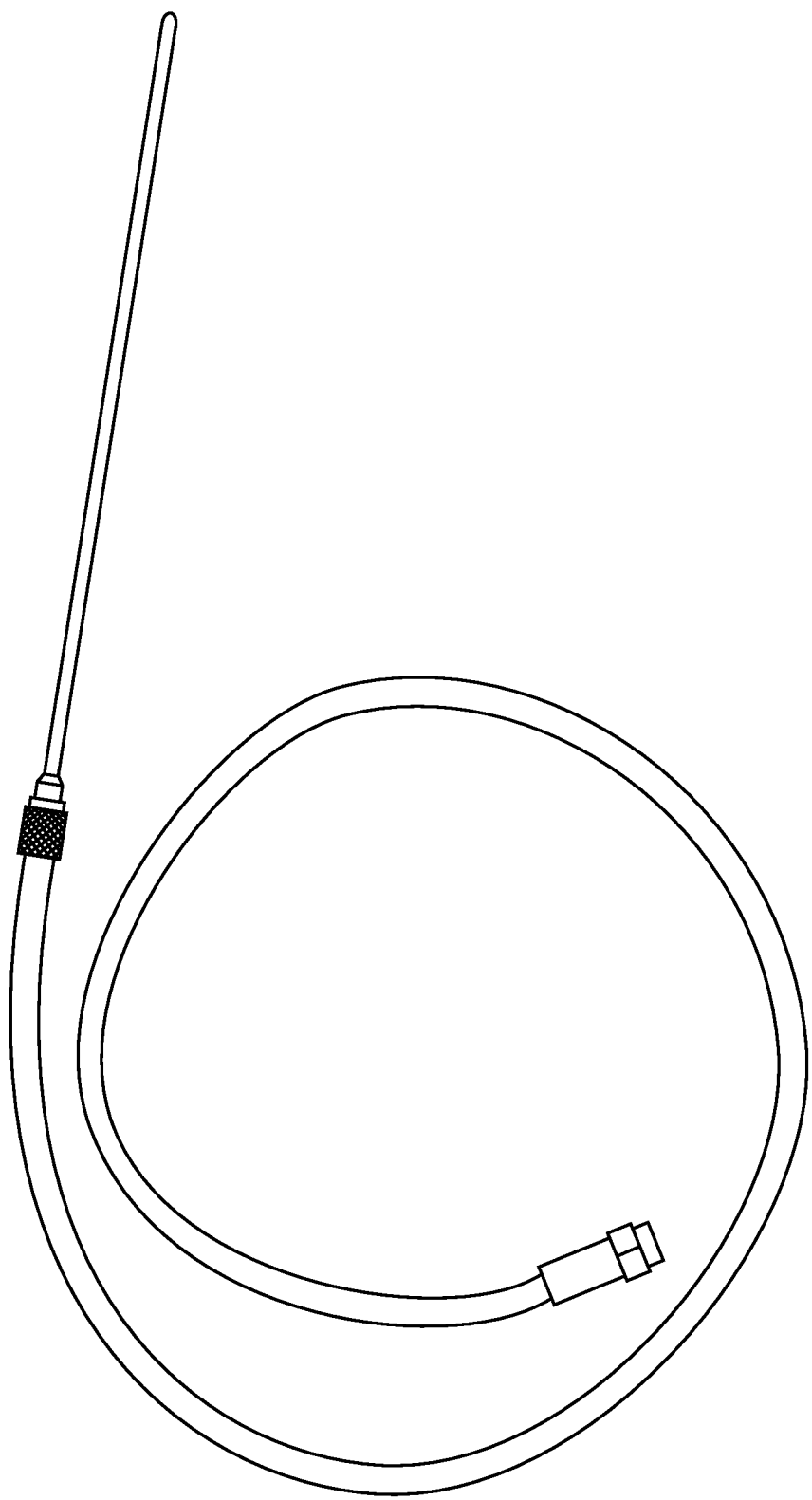
FIG. 13 is a perspective view of a cable installation tool having a coaxial cable temporarily fastened to the fastening end, according to an embodiment.
Figure 14:
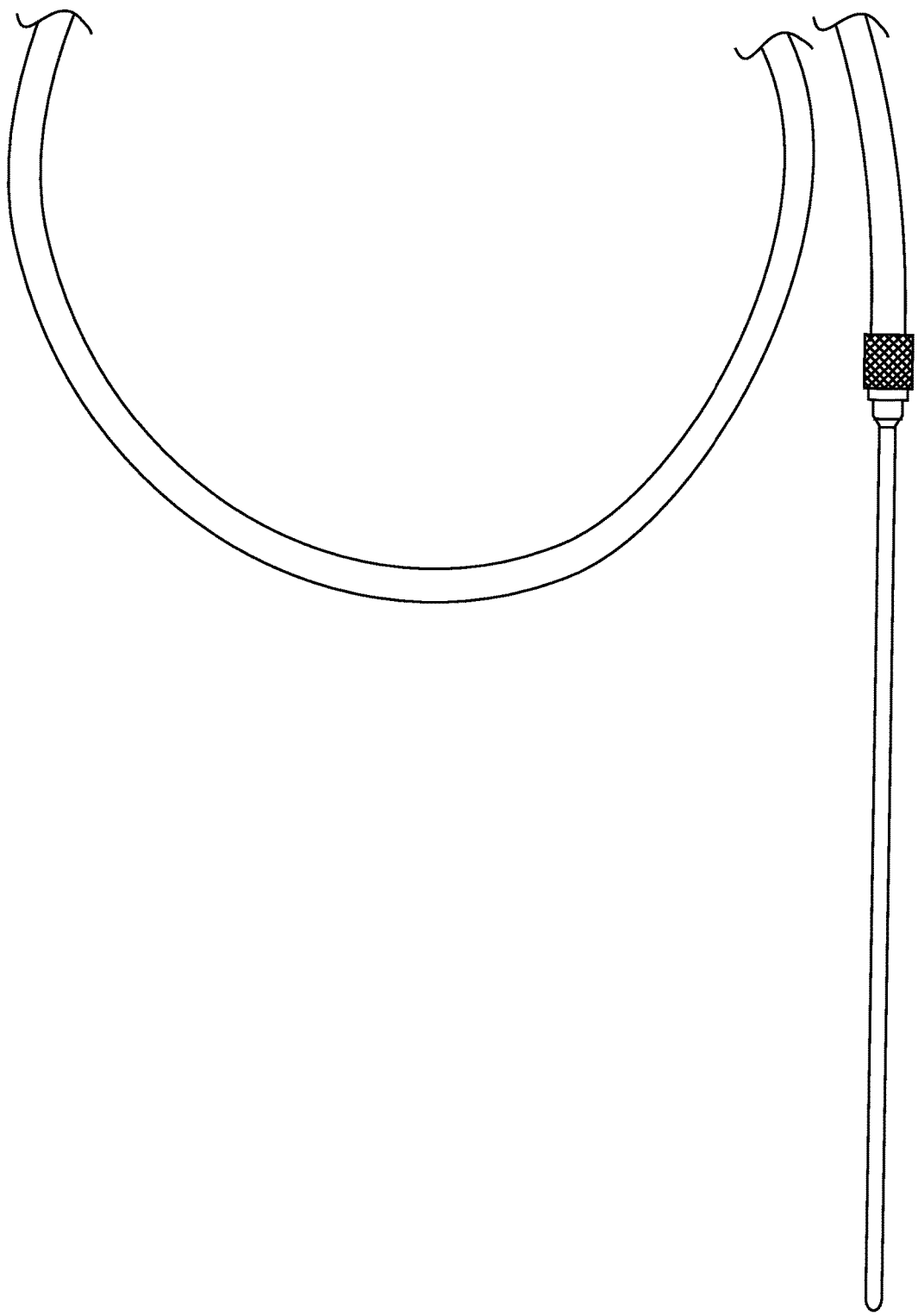
FIG. 14 is a side view of a cable installation tool having a coaxial cable temporarily fastened to the fastening end, according to an embodiment.
Figure 15:
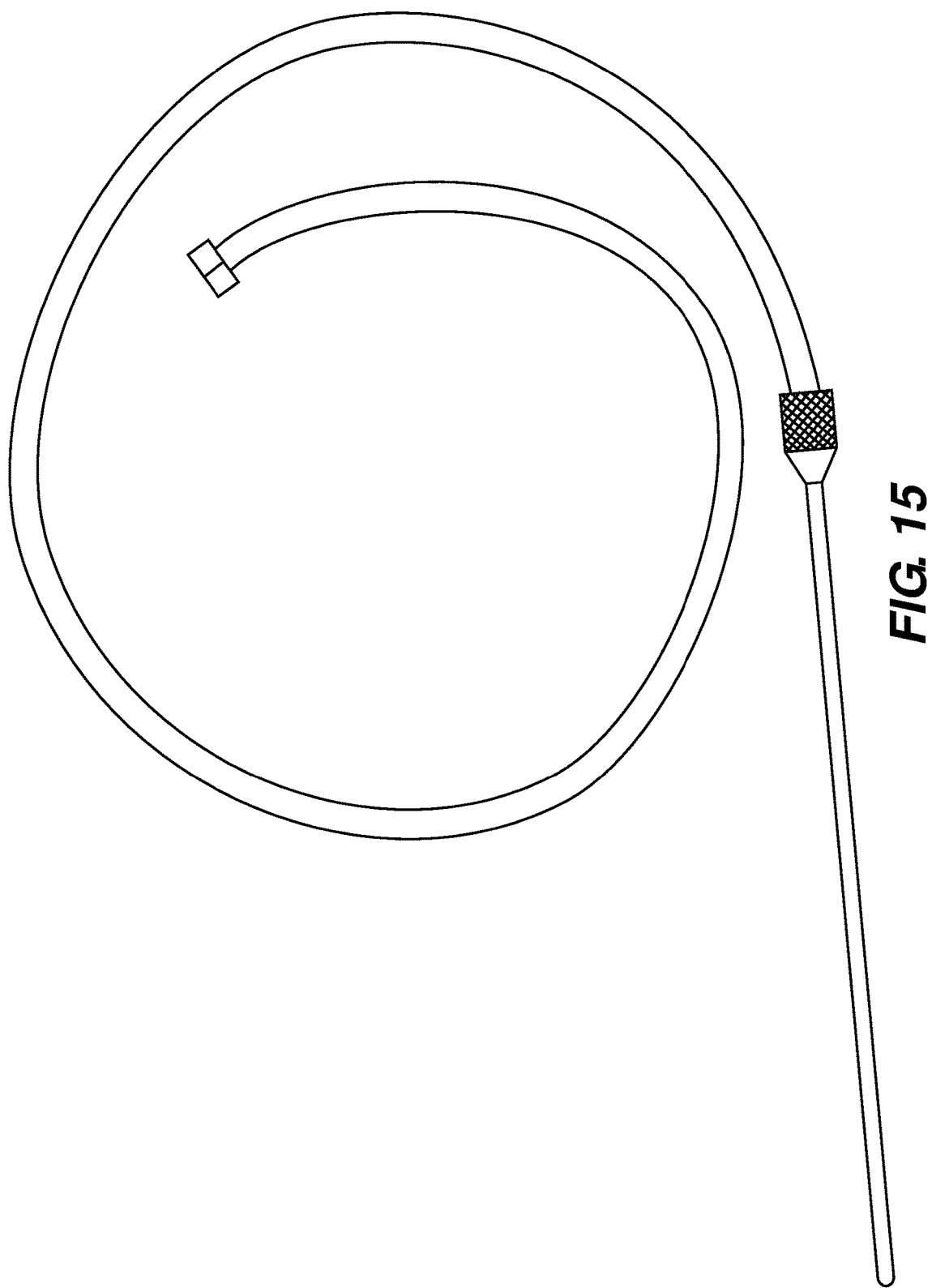
FIG. 15 is a side view of a cable installation tool having a cable temporarily fastened to the fastening end, according to an embodiment.

Referring again to FIG. 8, at 804, a cable is temporarily fastened to a fastening end of the cable installation tool. For example, the cable can be turned or screwed into a fastening end having a threading such as in FIGS. 1A-2B, or in FIGS. 13-15, wherein FIG. 13 is a perspective view of a cable installation tool having a coaxial cable temporarily fastened to the fastening end, according to an embodiment, FIG. 14, a side view of a cable installation tool having a coaxial cable temporarily fastened to the fastening end, according to an embodiment, and FIG. 15, a side view of a cable installation tool having a cable temporarily fastened to the fastening end, according to an embodiment.

In another embodiment, the cable can be inserted into a fastening end and engaged by teeth or prongs, such as in FIGS. 3A-3B. In another embodiment, the cable can be clipped onto a spring-loaded fastening end such as in FIG. 4. In another embodiment, the cable can be looped or tied around a fastening end having a single aperture, such as in FIGS. 5A-5B. In another embodiment, the cable can be threaded, looped, or tied around a fastening end having three apertures, such as in FIGS. 6A-6B. The aforementioned fastening ends are given only by way of example and are not intended to limit the scope of embodiments.

Referring again to FIG. 8, at 806, the cable installation tool and the operably coupled cable are threaded through the wall opening. In embodiments, the cable installation tool can be positioned proximate a pre-drilled opening on an interior or exterior wall and pushed by the user through an insulation layer in the interior void of the wall to an opposite pre-drilled opening. In embodiments, the cable installation tool is long enough to span the interior void of the wall. In other embodiments, the cable installation tool is shorter than the span of the interior void of the wall to allow the user to exit the wall at a non-parallel angle from the first pre-drilled opening, should the two openings not line up.

At 808, the cable installation tool is removed from the cable. In embodiments, the cable installation tool can be removed by unthreading, unclipping, disengaging teeth, untying or removing a loop of the cable from the fastening end. The installer can then prepare the cable for final termination on the wall or other final installation as needed.

In another embodiment, systems utilizing a cable installation tool can also include temporary ends to aid in threading wires into the cable installation tool, such as the threaded taper of fastening end 202. For example, disposable wire ends can be operably coupled to the wire to be threaded. One or more end adapters as can aid in threading small dual wires, such as two-pair phone wires and speaker wire, into a cable installation tool.

Figure 16A:
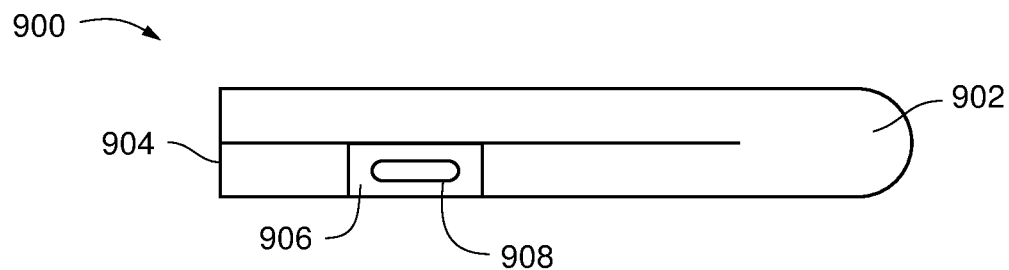
FIG. 16A is a side view of a complementary end adapter for interfacing with a fastening end of a cable installation tool, according to an embodiment.
Figure 16B:
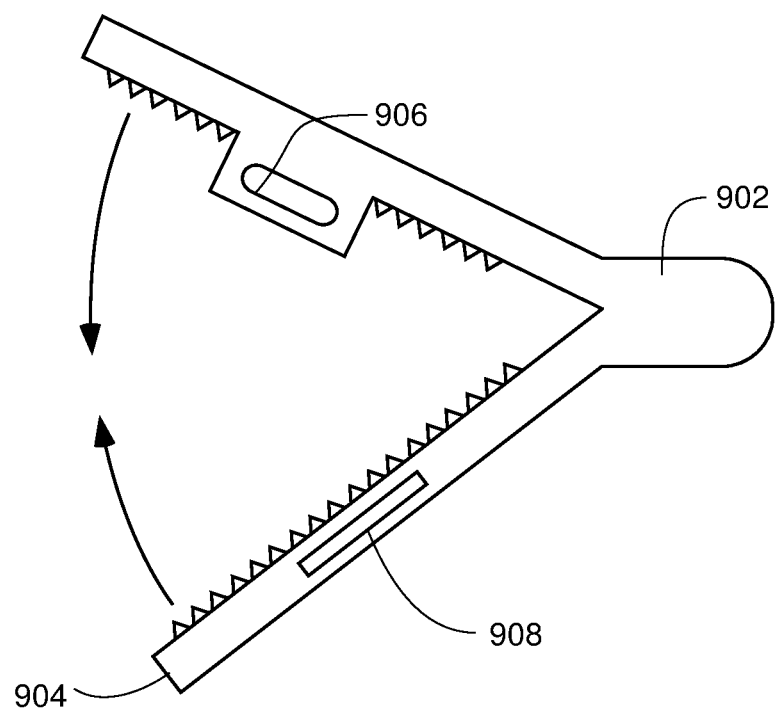
FIG. 16B is a side view of the end adapter of FIG. 16A in an open position, according to an embodiment.
Figure 16C:
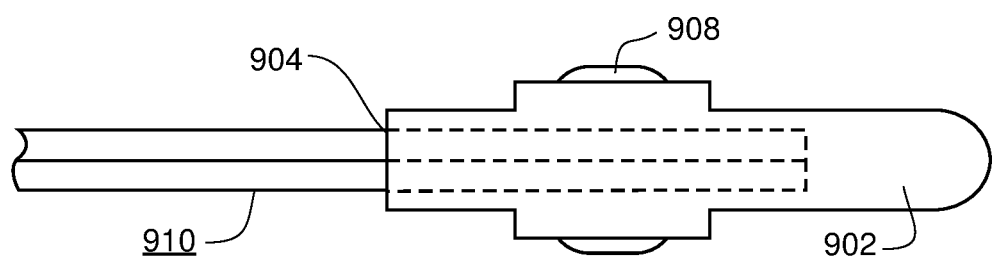
FIG. 16C is a top view of the end adapter of FIG. 16A in a closed position with operably coupled wires, according to an embodiment.

In another example, referring to FIGS. 16A-16C, a reusable end adapter 900 is depicted. Referring to FIG. 16A, a side view of complementary end adapter 900 for interfacing with a fastening end of a cable installation tool is depicted, according to an embodiment. In an embodiment, a kit can comprise disposable or reusable end adapters. In an embodiment, end adapter 900 can receive one or more wires on one end and be configured to fasten into the fastening end of the cable installation tool on a distal end. For example, if two speaker wires need to be threaded, but the wires may not make sufficient contact with the cable installation tool, an end adapter can be utilized.

End adapter 900 generally comprises a generally u-shaped body having first and second ends connecting at a relative intersection point. Body can open or close at the relative intersection point to create a wire-receiving end 904. When cable-insertion end 904 is in a closed position, the body creates a tip end 902 configured to be inserted into a cable installation tool.

Referring to FIG. 16B, a side view of end adapter 900 of FIG. 16A is depicted in an open position, according to an embodiment. End adapter 900 comprises open wire-receiving end 904 and tip end 902. Open wire-receiving end 904 can include two or more projections that can be moved toward each other to secure the wire. In an embodiment, small teeth on one or more of the projections grip the wire once inserted. Tip end 902 can be configured to protrude and be of a shape and size suitable for screwing or otherwise coupling to the fastening end of the cable installation tool. In an embodiment, the tip end can be slightly malleable or deformable to thread onto, for example, the threaded taper of FIG. 2.

In an embodiment, an end adapter further comprises a latch subassembly to ensure a consistent connection between the projections of open wire-receiving end 904 once closed. The latch subassembly can include an aperture-creating portion 906 and a projecting "bump" portion 908 that snaps into aperture-creating portion 906.

Referring to FIG. 16C, a top view of end adapter 900 of FIG. 16A is depicted in a closed position with an operably coupled wire 910, according to an embodiment. Once closed, end adapter 900 secures operably coupled wire 910. End adapter 900 can then be threaded onto a cable installation tool. In particular, end adapter 900 can be threaded onto a fastening end of the cable installation tool.

In an embodiment, one or more threaded extensions can be utilized to extend the length of the cable installation tool. For example, one or more threaded extensions can be coupled to the fastening end of the cable installation tool, potentially in combination with a threaded taper such as that shown in FIG. 2, to extend the length of the tool.

In certain embodiments, certain types of cable must be handled differently due to the characteristics of the cable. For example, glass fiber optic cable may need to be pulled through a residential or commercial wall. Fiber optic cable is extremely fragile. Accordingly, embodiments provide optional universal adapters for receiving the male or female ends of the fiber cable and which can be screwed onto a cable installation tool similar to other cable attachments. In embodiments, an optional adapter for each type of fiber cable end can be provided.

Fiber optic cable typically comes in standardized lengths for various applications as the fiber ends are generally not able to be attached by a technician in the field. Fiber cable typically comes from the factory with a protective mesh sleeve covering the end of the cable. The purpose of the mesh is to protect the cable end while fishing to its intended destination.

Referring to FIG. 17A, a side view of a fiber optic cable installation tool 1000 and a fiber optic end adapter 1002 having a fiber optic cable 1004 temporarily fastened to fiber optic end adapter 1002 is depicted, according to an embodiment.

Referring to FIG. 17B, a side view of fiber optic end adapter 1002 is depicted, according to an embodiment. FIG. 17C is a bottom view of fiber optic end adapter 1002, according to an embodiment. Fiber optic end adapter 1002 generally comprises a tip end 1006, a receiving aperture 1008, and a plurality of flexible wings 1010.

Tip end 1006 is configured to protrude and be of a shape and size suitable for screwing or otherwise coupling to a fastening end of a cable installation tool. In an embodiment, fiber optic end adapter 1002 and particularly, tip end 1006 can be made of flexible plastic for threading onto the communications tool.

Receiving aperture 1008 comprises structure defining a void to receive a fiber optic cable. Receiving aperture 1008 can be proximate tip end 1006 or can be presented further from tip end 1006 in an elongated fiber optic end adapter.

Each of plurality of flexible wings 1010 project from receiving aperture 1008 and are configured to snap over the fiber optic cable end. As depicted in FIGS. 17A-17B, flexible wings 1010 are presented as evenly spaced and opposite the other along receiving aperture 1008. However, flexible wings 1010 can be asymmetrically spaced along on receiving aperture 1008.

In operation, referring again to FIG. 17A, fiber cable 1004 can be snapped into fiber optic end adapter 1002 by aligning the fiber end with receiving aperture 1008 and pushing the fiber end into receiving aperture 1008 to allow flexible wings 1010 to snap over the fiber end and secure the fiber end in receiving aperture 1008. In an embodiment, prior to, or after, such fastening, tip end 1006 can be threaded onto a fastening end of cable installation tool 1000 to create a temporarily-secured chain of cable installation tool 1000, fiber optic end adapter 1002, and fiber cable 1004. The temporarily-secured chain can then be used to thread fiber cable 1004 in a cable installation.

Referring to FIG. 18, a side view of another fiber optic end adapter 1100 is depicted, according to an embodiment. Fiber optic end adapter 1100 generally comprises a tip end 1102, a receiving aperture 1104, and a hook 1010. Tip end 1102 and receiving aperture 1104 can be substantially similar to corresponding structures described in FIGS. 17A-17C.

Hook 1106 projects from receiving aperture 1104 and is configured to attach to a prepared fiber cable. For example, hook 1106 can attach to the protective mesh sleeve covering the end of a fiber cable. In particular, the mesh sleeve can catch on hook 1106 or the body of receiving aperture 1104 to secure the fiber cable. Such a hook 1106 utilizes the factory-provided packaging to keep the cable protected while installing the cable.

Figure 19A:
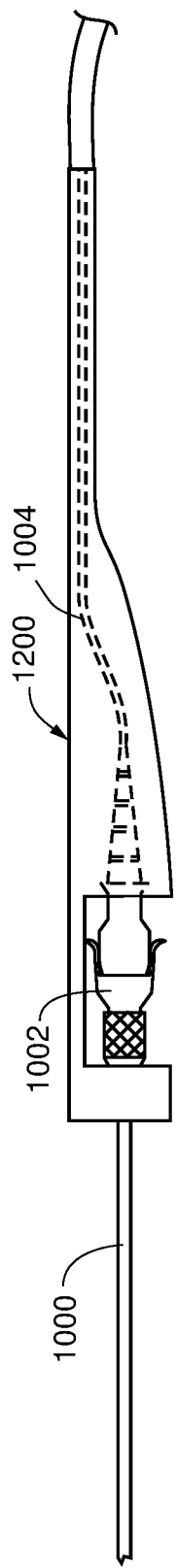
FIG. 19A is a side view of a fiber optic cable installation tool having a fiber optic cable temporarily fastened to the fiber optic end adapter and a reinforcement attachment coupled to the fiber optic cable installation tool, according to an embodiment.
Figure 19B:
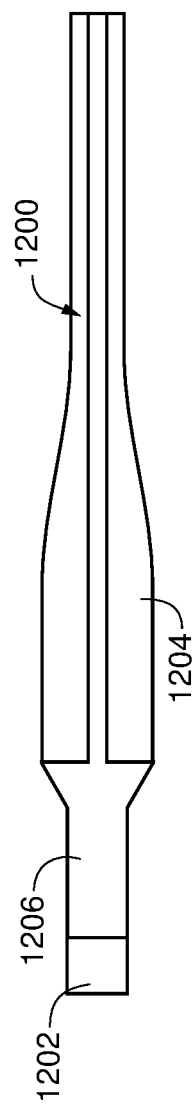
FIG. 19B is a bottom view of the reinforcement attachment of FIG. 19A, according to an embodiment.

In embodiments, a reinforcement attachment can further support delicate cables. Referring to FIG. 19A, a side view of a fiber optic cable installation tool having a fiber optic cable temporarily fastened to the fiber optic end adapter and a reinforcement attachment coupled to the fiber optic cable installation tool is depicted, according to an embodiment. For example, a reinforcement attachment 1200 is shown temporarily coupled to cable installation tool 1000 a fiber optic cable 1004 to aid the coupling of fiber cable 1004 into fiber optic end adapter 1002. Referring to FIG. 19B, a bottom view of reinforcement attachment 1200 is depicted, according to an embodiment.

Reinforcement attachment 1200 comprises a tool receiving end 1202, a sheath 1204, and a support bridge 1206 connecting tool receiving end 1202 and sheath 1204. In an embodiment, a cable installation tool such as cable installation tool 1000 is slid through an opening in tool receiving end 1202. In certain embodiments, the opening in tool receiving end 1202 is the same diameter as the cable installation tool 1000 projecting end.

Sheath 1204 comprises a close-fitting cover configured to receive cable 1004. Cable 1004 can be inserted inside sheath 1204 through a slit in the relative bottom of sheath 1204. In an embodiment, sheath 1204 can be further secured to the factory-provided protective sheathing of fiber cable 1004 before pulling.

Bridge 1206 thus provides another link supporting cable installation tool 1000 via tool receiving end 1202 and fiber cable 1004 via sheath 1204 to further support the fragile cable during cable pulling.

In embodiments, a cable installation tool can be provided to a user in the form of a kit which includes a cable installation tool according to any of the embodiments described herein, an end adapter for using with the cable installation tool, and a set of instructions for using the cable installation tool and end adapter as described herein. The kit can comprise a single package having all of the components needed for cable installation. The instructions can be provided as part of the kit, or indications may be provided linking a user to electronically accessible instructions. The instructions can be any of a variety of tangible or intangible media including, but not limited to a written manual, a CD or CD-ROM, CD, CD-ROM, DVD, BluRay, digitally downloadable or viewable on onto a personal device, such as a computer, tablet, smart device, and/or via verbal instruction by a provider of the kit. In another embodiment, the instructions are provided, for example, by a manufacturer or supplier of the assemblies, separately from providing the assemblies, such as by way of information that is accessible using the Internet or by way of seminars, lectures, training sessions or the like. The kit and/or the separate components of the kit can be provided by causing the kit and/or components to be manufactured and made available to a user.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A cable installation tool comprising:
   a cable fastening end including—
      an outer surface configured to be gripped by an installer, and
      an inner surface creating at least a partially-hollowed aperture for receiving and temporarily securing a cable, the inner surface being continuously tapered from a cable insertion end to an end proximate the elongated member and threaded substantially throughout the inner surface to grip the cable upon twisted insertion of the cable within the inner surface; and
   a projecting end extending from the fastening end including— an elongated member having a tip adapted to push and deflect construction debris to allow the projecting end to pass the construction debris, wherein the elongated member is rigid and can be manipulated through a wall by the installer to thread the temporarily secured cable through the wall.

2. The cable installation tool of claim 1, wherein the inner surface is fully hollowed so the cable is received through the cable fastening end and extends at least partially parallel the projecting end.

3. The cable installation tool of claim 2, wherein the inner surface comprises a plurality of prongs to temporarily grip the cable.

4. The cable installation tool of claim 3, wherein the plurality of prongs are positioned at an acute angle relative to the inner surface to allow the cable to be inserted at a cable insertion end and not removed from the cable insertion end by action of the plurality of prongs gripping the cable when pulled towards the cable insertion end after the cable has been inserted.

5. The cable installation tool of claim 1, wherein the outer surface is cross-hatched to provide increased grip to the installer.

6. The cable installation tool of claim 1, wherein the outer surface comprises a 5/16" diameter.

7. The cable installation tool of claim 1, wherein the elongated member is between 6" and 24" in length.

8. The cable installation tool of claim 1, wherein the elongated member is a smaller diameter than the cable fastening end.

* * * * *